L. J. BENNETT.
Disintegrating-Mill.
No. 225,552. Patented Mar. 16, 1880.
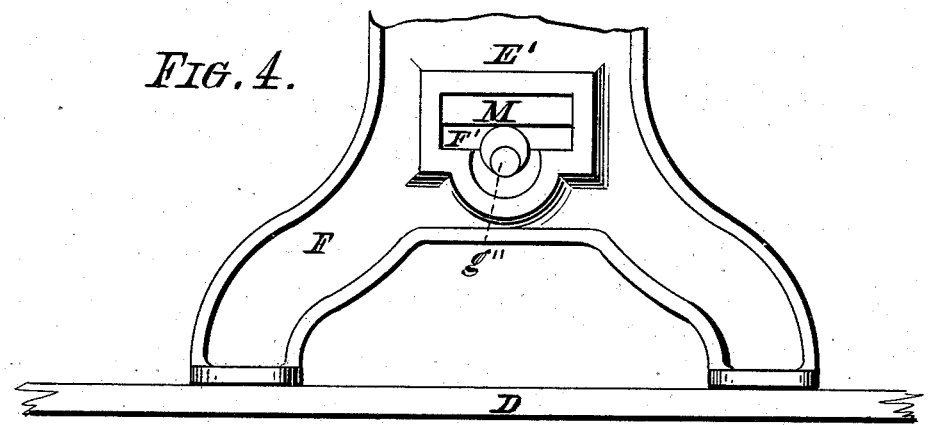
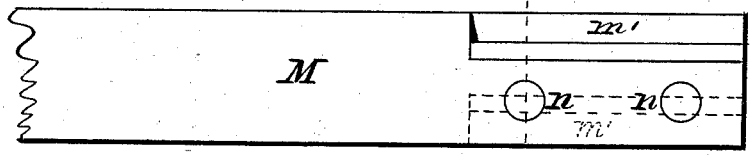
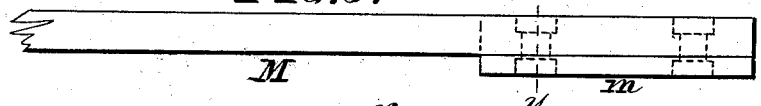
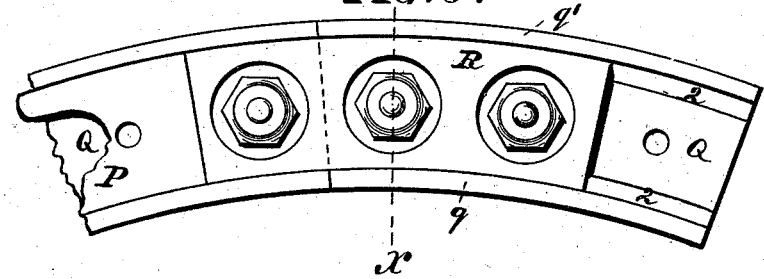
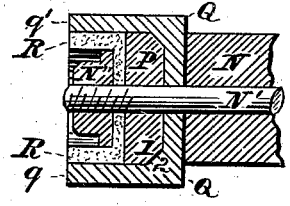
Witnesses:
Michael J Stark
Juliana W Doff
Inventor:
Lewis J Bennett
by Michael J Stark
Attorney.

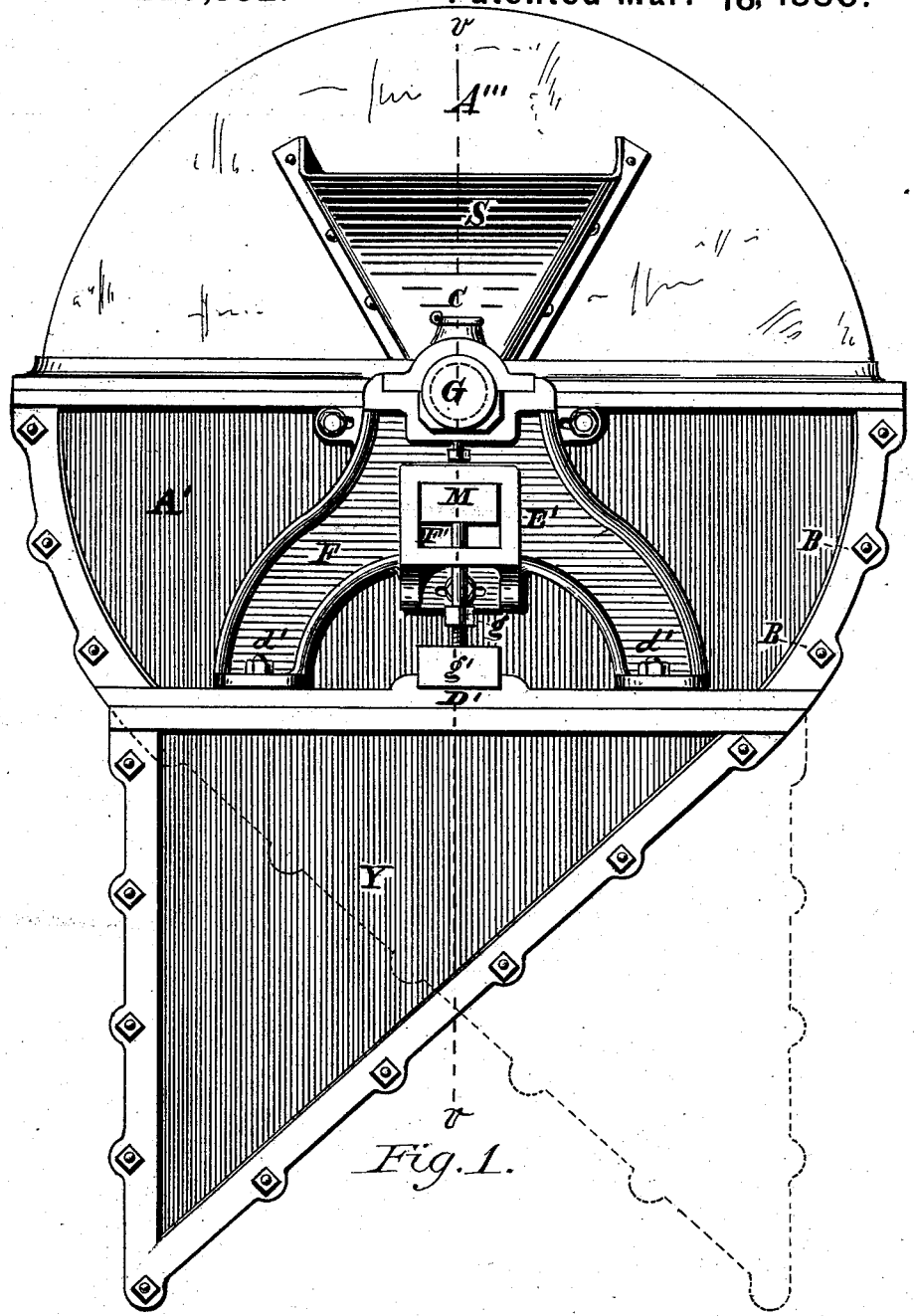

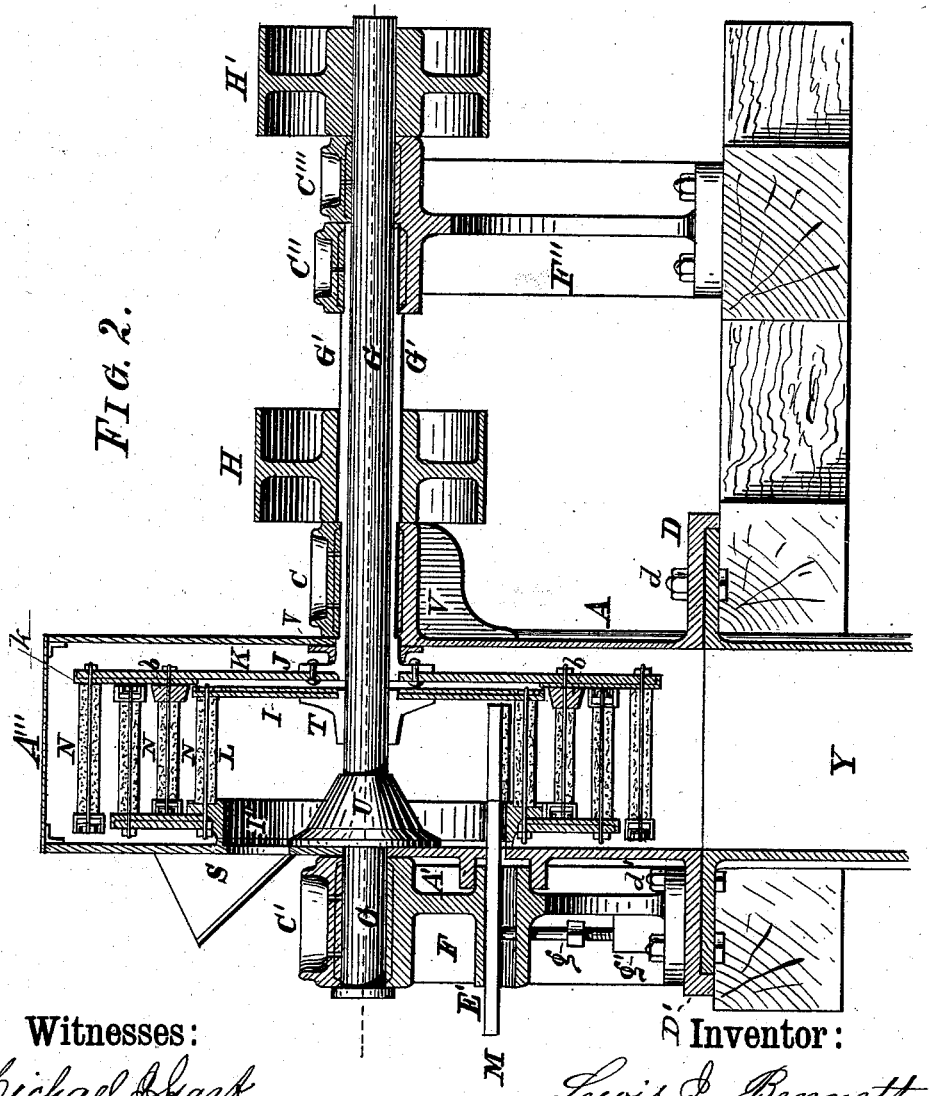

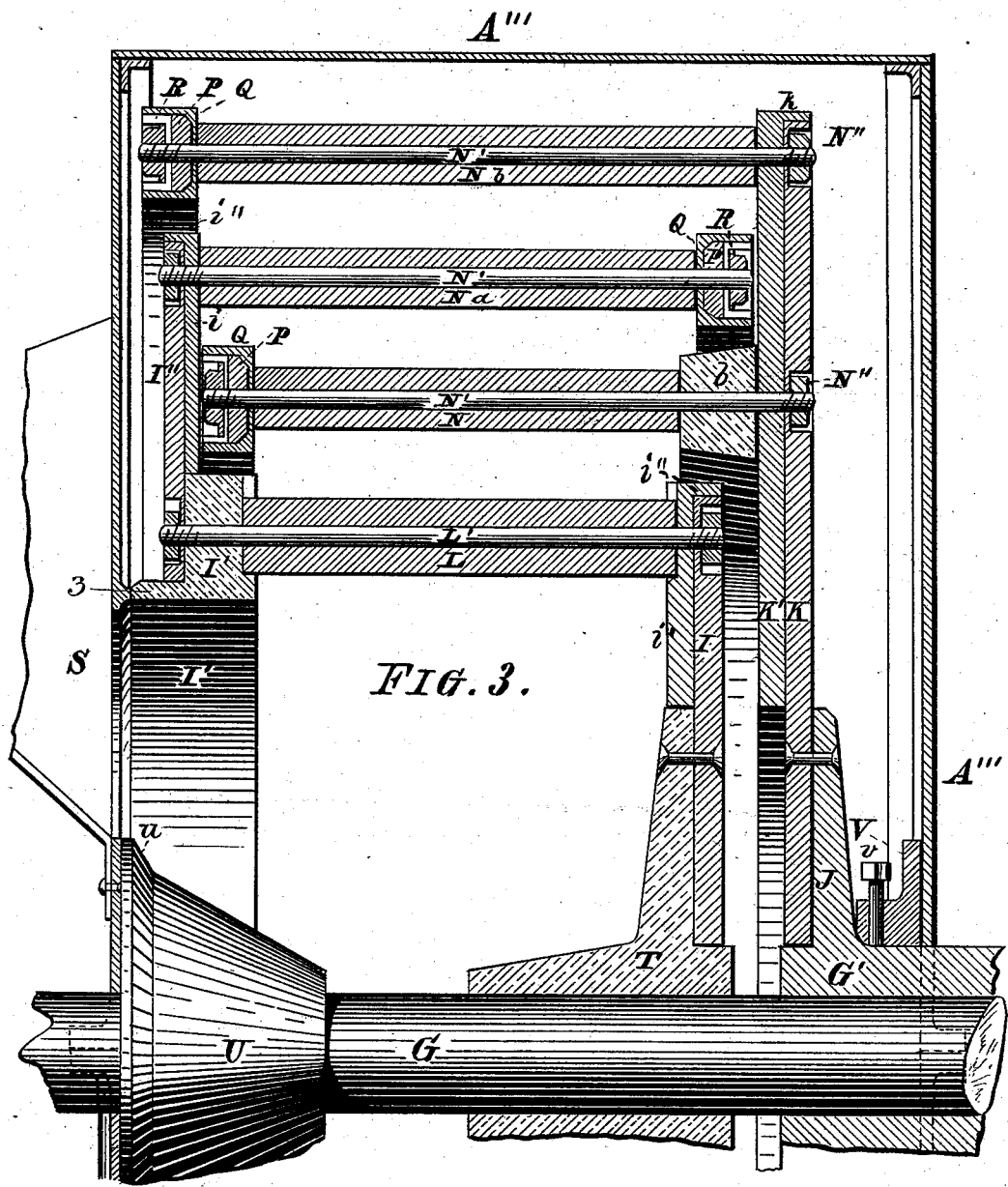

UNITED STATES PATENT OFFICE.

LEWIS J. BENNETT, OF BUFFALO, NEW YORK.

DISINTEGRATING-MILL.

SPECIFICATION forming part of Letters Patent No. 225,552, dated March 16, 1880.

Application filed February 8, 1879.

*To all whom it may concern:*

Be it known that I, LEWIS J. BENNETT, of Buffalo, in the county of Erie and State of New York, have invented certain new and useful Improvements on a Disintegrating-Mill; and I do hereby declare that the following description of my said invention, taken in connection with the accompanying sheet of drawings, forms a full, clear, and exact specification, which will enable others skilled in the art to which it appertains to make and use the same.

This invention has special reference to disintegrating-mills, the object being principally to improve their durability and increase their capacity, and at the same time reduce the expense of repairs to the lowest possible degree.

In my former patent, dated January 14, 1879, No. 211,316, I have shown a mill composed of cages revolving within a suitable casing, the cages being constructed of disks of cast-iron and rings and pins of compound chilled cast-iron and wrought-iron. This mill is susceptible of further improvements in accordance with the peculiar arrangement of parts and details of construction, as hereinafter first fully set forth and described, and then pointed out in the claims.

In the drawings already referred to, which serve to illustrate my invention more fully, Figure 1 is a front elevation of my improved mill. Fig. 2 is a longitudinal sectional elevation in line $v\ v$ of Fig. 1. Fig. 3 is a similar view of a fragment of the casing and interior arrangement, drawn to a larger scale. Fig. 4 is a fragment of the standard F, showing a modified form of my fastening for the breaker M. Fig. 5 is a plan of a portion of the ring-casing. Fig. 6 is a transverse section in line $x\ x$ of Fig. 5. Figs. 7, 8, and 9 are detail views of the breaker M.

Like parts are designated by letters of reference of like name and kind in all the figures.

A A' are the metallic sides for the mill-casing. They are symmetrical in contour, and provided with flanges D D', by means of which they are secured upon properly-constructed foundations.

In my former patent these sides are shown to be made in one piece with the sides of the chute Y; but in the present instance the latter are formed separately and secured to the flanges of the former by means of screw-bolts $d\ d'$, the latter bolts also serving as a means of attachment of the standard F. By means of this arrangement I am enabled to place the inclined side of the chute Y on either side of the casing, and thus render the mill reversible, which is a great advantage in structures of this kind, because it enables the mill being placed in any position with reference to existing buildings within which it is to be placed, so that the discharge may be in a direction most suitable to the circumstances of each individual case, and thus requiring no predetermined plans or arrangements as to the position of the said chute.

In my former patent the rings are shown to be incased in a plate having a single projecting ledge to protect the inner side and inner edge of said rings, while another plate covers the outer side. This construction left the outer edge of said rings and also the nuts free, and thus unprotected against the abrasive action of the material to be ground. I therefore form on plates Q a ledge, $q'$, which embraces the outer edge of said ring, and provide the plates R, which fit between the ledges $q\ q'$, with circular recesses, wherein the nuts $N''$ of the bolts $N'$ are placed, and thus removed from the abrasive action of said material. This is a very important advantage, because the frequent removal and renewal of the nuts and the danger connected with their accidentally unscrewing and consequent breakage form quite an item in the running expense of the mill.

The inner edges of the rings P are preferably beveled at 1 and the plates Q formed to correspond at the corners 2. This arrangement causes the rings P to tightly wedge into the plates Q, and thereby materially increase its stiffness.

The breaker M, which is passed through the aperture F' in the projection E' on the standard F, is provided with a chilled-metal shoe, $m$, riveted or otherwise fastened to the wrought-iron stock. This shoe has preferably two ledges, (although one would answer in most cases,) which are inclined so as to coincide with a line drawn from the center of the cages. This inclination causes the material to be reduced to strike the front edge squarely, and thereby to avoid the wedging thereof under the breaker which invariably takes place when the front side of said breaker is at right angles with its bottom side, which in that case forms an acute angle with the line of travel of the innermost series of pins, and thereby causes the wedging effect, and results in an undue absorption of power and greatly straining the entire mill. I prefer to bevel both sides of this breaker, (though one side is only used,) so as to allow the cages being run in either direction. This breaker was heretofore held in position by means of set-screws tapped in the projection through which it is passed; but these screws wear rapidly away, owing to the fact that some of the gritty substance will escape from the aperture in the casing for the passage of said breaker and lodge in the threads. To avoid this objection I place a screw-threaded block, $g'$, upon the flange D', and provide it with the screw-bolts $g$, having their lower ends only threaded to fit the block $g'$, while their upper ends, engaging the breaker M, are blank. In this manner I remove the threaded part of the bolts $g$ from the source of wear, and thus considerably enhance their durability.

As an equivalent for the set-screws, I may use an eccentric-rod, $g''$, Fig. 4, working within the projection E', and retain the breaker thereby in position. This eccentric-rod may be readily cast in a chill, and will then be sufficiently hard to resist the abrading effect of said gritty substances for quite a space of time.

For a mill for reducing ordinarily hard substances the disks K, I, and I' may be of cast or wrought iron; but for harder substances, such as ore, cement, stone, &c., I prefer to make the disks of sheet iron or steel. In this case I shall secure the disk K to the flange J on the hollow shaft G' and provide the same with a separate projecting ring, $b$, and also with a wear-plate, K', having a ledge, $k$, overlapping the edge of said disk K. I shall furthermore secure a flanged hub, T, to the shaft G, and fasten the disk I to the flange, providing said disk with a wear-plate, $i'$, having a ledge, $i''$, the same as the ledge $k$ on the disk K. I shall furthermore construct the disk I' of three separate pieces—viz., an annular ring, I', a flange, I'', and a wear-plate, $i$, having the ledge $i''$ overlapping the edge of the flange I''. In this manner I protect the inner faces with a metal much harder than their supporting-disks, which, when worn, can be readily removed and replaced. These wear-plates K', $i$, and $i'$ may be made of cast-iron; but I prefer to cast them in chills, and, to enable their being readily cast in this manner, construct them in sections. They are secured to the disks by no other means than the bolts L' N' securing the rounds or pins L, N, N$^a$, and N$^b$, and this arrangement is therefore at once cheap and durable.

By making the disks of a metal of superior toughness and plating them with one of far greater hardness than the disks, I have been enabled to considerably reduce the thickness and weight of the plates, and thereby to run the mill at a far greater velocity than could heretofore be done, in consequence of which the capacity of the mill has been increased to such an extent as to grind the hardest substances as fast as the material can possibly be introduced through the spout S.

To prevent the pulverized material and dust from escaping through the opening in the side A' for the passage of the shaft G, and at the same time to direct the material to be reduced into the center of the innermost cage, and thereby to more equally distribute said material, I provide said shaft G with a cone, U, having a flange, $u$, reaching up to the opening in the cover A''', through which the stuff is fed. This cone is movably fixed to said shaft and runs with its face in close contact with the inner side of the casing A', and thus closes the said opening therein. When this face becomes somewhat worn the cone is readily slid up, and thus accomplishes the desired result in an effectual manner.

Upon the shaft G' I shall fix a flange, V, running with its face in contact with the inner wall of the side A, and thus close the opening in that side of the casing, it being capable of being slid up in the same manner as the cone U. The object of thus closing the said openings is to prevent dust, &c., from entering the bearings C C', and thereby cause their speedy destruction.

Having thus fully described my invention, I claim—

1. The combination, with the rings P, of the plates Q, having the ledges $q\ q'$, and the plates R, fitted between said ledges and provided with circular recesses for the reception of the nuts N'', as specified, the parts being held together by the bolts N', securing the beaters in position, as stated.

2. In disintegrating-mills having cages revolving in a vertical plane in opposite directions, the combination, with the hollow shaft G', having the flange J, of the disk K, provided with the annular ring $b$, made separate from said disk and fixed thereto by the nutted bolts N', securing the beaters N to said disk, to the exclusion of any other means of fastening, substantially as and for the object stated.

3. The disks I, I', and K, having the wear-plates $k$, $i$, and $i'$, held in position by the bolts securing the beaters to said disks, to the exclusion of any other means of fastening, as and for the purpose specified.

4. The annular front ring of a cage for disintegrating-mills, composed of the ring I', flange I'', and wear-plate $i$, the parts being held together by the bolts L' and N', securing the beaters L and N$^a$ to said flanges and annular ring, as stated.

5. In disintegrating-mills having rotary beaters, the combination, with the front plate composed of an open ring, I', having a projecting ledge, 3, and an annular disk, I'', seated upon said ledge, of the beaters L and the disk I, said disk I'' being secured to the ring I' by the bolts L', retaining the beaters in position, substantially as described, for the object specified.

6. In disintegrating-mills composed of cages having beaters revolving in opposite directions, a breaker, M, having one or both its edges, $m$, beveled, the narrower part of said breaker being toward the center of revolution of said cages, as and for the use and purpose indicated.

7. In disintegrating-mills having cages revolving in opposite directions, the combination, with said cages, of the casing A A', having the flanges D D', the chute Y, having one vertical and one inclined side, and the breaker M, having both its edges beveled, as described, said chute being secured to the flanges D D' with capability of being reversed, whereby the direction of revolution of said cages may be reversed, substantially as and for the object stated.

8. The combination, with the casing A A', of the shaft G and the cone U, said cone being adjustably affixed to said shaft and running with its base against the inner side of said casing, whereby dust is prevented from escaping through the aperture in said casing for the passage of said shaft, and the material to be disintegrated distributed in the inner cage, substantially as and for the purpose specified.

9. The combination, with the standard F, having the projection E, of the breaker M and the base-block $g'$, having the set-screws $g$, said screws having their threaded end engaging the internal screw-threaded block $g'$ and their opposite blank ends passed through apertures in said projection E, whereby the upper ends are guided and prevented from shifting when the screws are tightened, as and for the object specified.

In testimony that I claim the foregoing as my invention I have hereto set my hand and affixed my seal in the presence of two subscribing witnesses.

LEWIS J. BENNETT. [L. S.]

Attest:
MICHAEL J. STARK,
JULIANA N. DOPP.